Aug. 2, 1966  E. W. SPEARS, JR  3,263,420
SWIVELING NOZZLE ENGINE
Filed March 18, 1964  2 Sheets-Sheet 1

INVENTOR.
Esten W. Spears, Jr.
BY
Paul Fitzpatrick
ATTORNEY

United States Patent Office 3,263,420
Patented August 2, 1966

3,263,420
SWIVELING NOZZLE ENGINE
Esten W. Spears, Jr., Indianapolis, Ind., assignor to General Motors Corporation, Detroit, Mich., a corporation of Delaware
Filed Mar. 18, 1964, Ser. No. 352,756
4 Claims. (Cl. 60—35.55)

My invention is directed to a jet propulsion engine having a swiveling or tilting jet nozzle to vary the orientation of the gas jet with respect to the engine. It is more specifically directed to the structure of such a nozzle and to improved structural cooperation between the swiveling nozzle and the gas generator which supplies the propulsive gases to it.

In terms of the preferred embodiment described herein, the invention may be outlined briefly as a swiveling jet nozzle combined with a gas generator of the turbojet type in which the swiveling nozzle embodies a universally mounted throat ring, a mounting for the ring at its center, and a support extending from this mounting to a bearing support spider at the exhaust end of the turbine of the gas generator. By virtue of the invention, a very simple and efficient swiveling nozzle is provided and the loads due to gas pressure on the nozzle are carried by the necessarily heavy bearing support rather than through the exhaust duct so that the exhaust duct may be of light construction.

My invention is particularly advantageous in connection with lift engines in which minimizing weight is of paramount importance, but is applicable to other types of jet propulsion installations. Particularly, in the preferred embodiment of the invention, the turbine support which also mounts the swiveling nozzle structure connects directly to the structure by which the lift engine is mounted in an aircraft so that the forces exerted by the nozzle are carried directly to this basic engine support and thus to the aircraft.

The nature and advantages of the invention will be more clearly apparent from the succeeding detailed description of the preferred embodiment of the invention and the accompanying drawings thereof.

Before proceeding with the detailed description, it may be pointed out that, while there may be some distinction between the terms "lift" and "propulsion" as applied to jet thrust devices, the terms are used interchangeably herein and are not differentiated so far as the disclosure and claims are concerned.

Figures 1, 2:
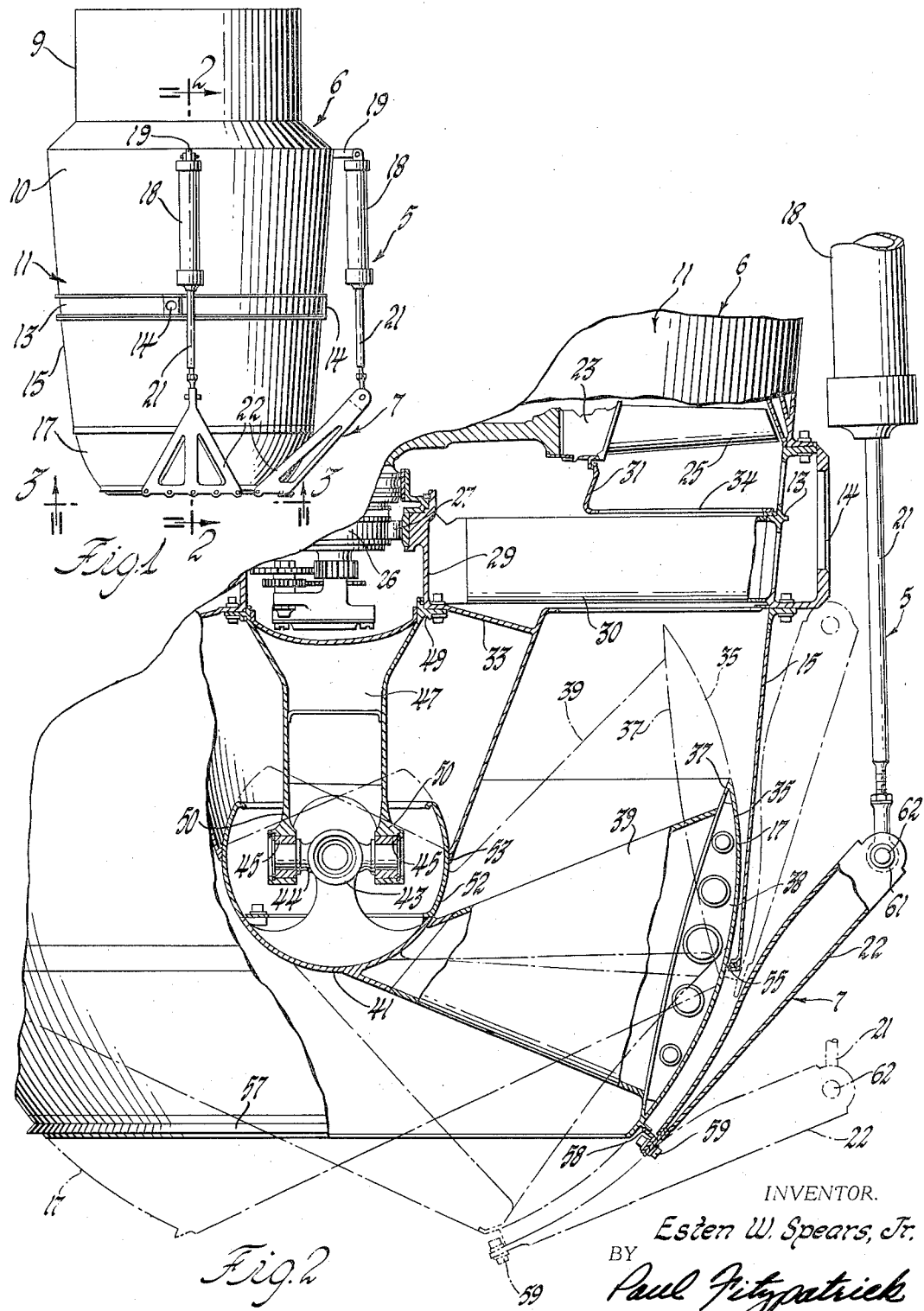
FIGURE 1 is a side elevation of a vertically oriented jet propulsion or lift engine, portions of the engine being shown schematically.
FIGURE 2 is a partial view of the turbine support and swivel nozzle structure with parts cut away and in section on a plane containing the axis of the engine as indicated by the line 2—2 in FIGURE 1.
Figure 3:
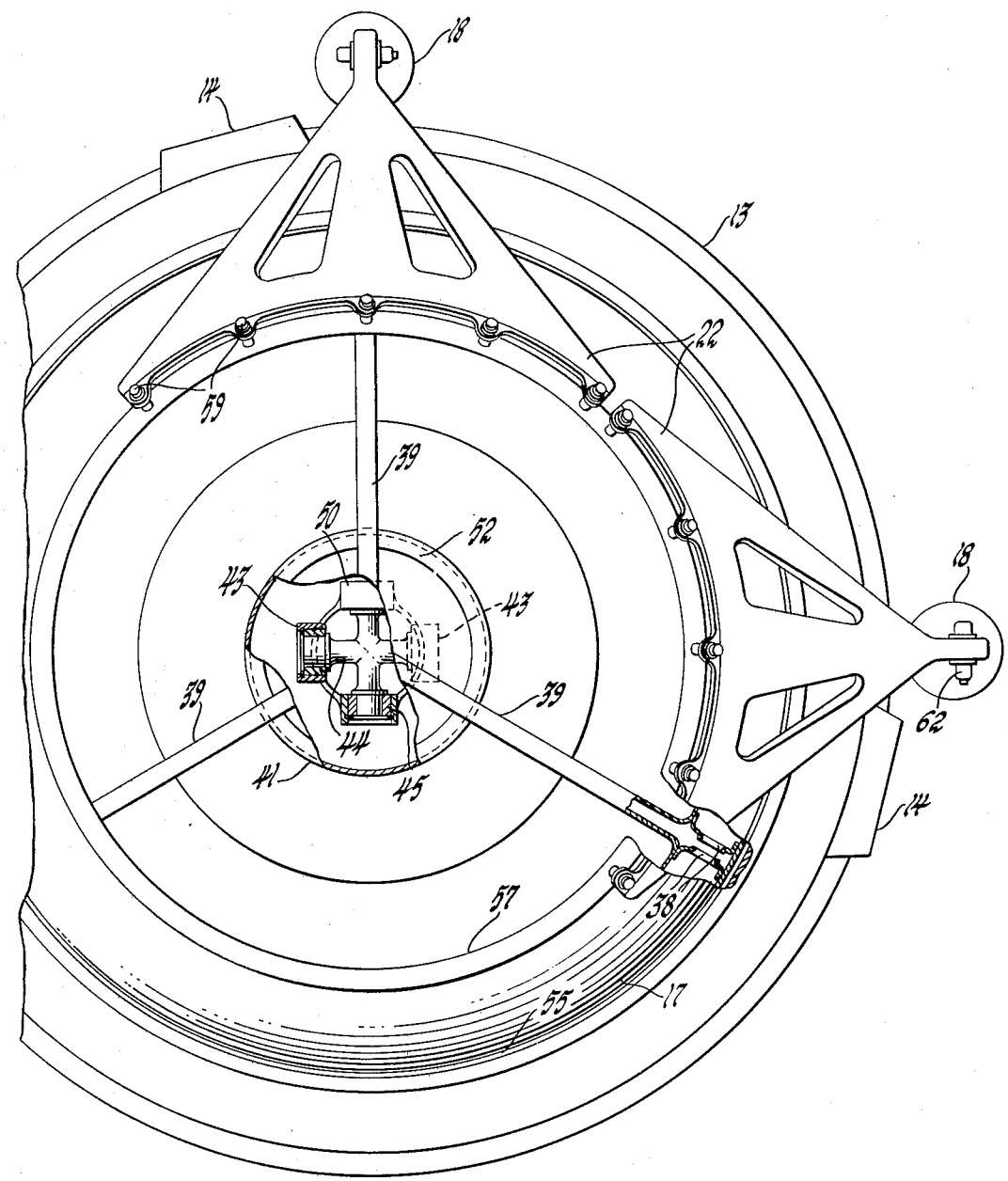
FIGURE 3 is a bottom view of the engine with parts cut away as indicated by the line 3—3 in FIGURE 1.

In FIGURE 1, a jet engine 5 comprises a gas generator 6 and exhaust nozzle structure 7. The gas generator includes a compressor 9, combustion apparatus at 10, and a turbine generally at 11. These are enclosed in an engine casing, which may be in sections, and which includes a main support ring 13 extending around the engine incorporating three mounting pads 14 disposed around the ring. The turbine and compressor are mechanically coupled by means not illustrated and the turbine, or the turbine-compressor group, includes a shaft, the lower or downstream end of which is supported from the ring 13.

The jet exhaust structure comprises an exhaust duct 15 extending downward from the ring 13 and a swiveling nozzle structure including a throat ring 17 through which the gas jet is discharged. The throat ring 17 has an exterior surface which is a zone of a sphere and is mounted for universal swiveling movement about its center, which is on the axis of the engine and slightly within the exhaust duct 15. The swiveling of the throat ring is effected by two actuators 18 which may be hydraulic cylinders, the forward ends of which are coupled to brackets 19 extending from the engine and the piston rods 21 of which are coupled to the throat ring through arms 22 fixed to the throat ring.

The turbine of the gas generator includes a wheel 23, mounting blades 25, and a shaft 26. The turbine shaft is supported by a bearing 27 in a bearing support ring 29, which in turn is supported by three or more radial struts 30 which are integral with (welded to) the outer ring 13. The structure of the gas generator will not be further described since the details of such structure are immaterial to my invention.

An inner tailcone 31 defining the inner wall of the upstream portion of the exhaust duct is integral with the bearing support and is connected to it by a web 33. Heat shields 34 around the struts 30 extend outwardly from the tailcone. In operation of the engine, the hot gas discharged from the ring of turbine blades 25 flows through the passage defined by the exhaust duct 15 and tailcone 31.

Proceeding to the structure of the swiveling nozzle, the throat ring 17 comprises an outer spherical wall 35, an inner generally conical wall 37, and stiffening ribs 38 extending longitudinally of the ring between the walls. The ring is supported by three struts 39 disposed 120° apart. These struts are welded or brazed to the ring 17 and are welded or otherwise fixed to a hub 41 which may be a forged or fabricated structure. The struts 39 taper in chord toward the engine axis as shown. They are of streamlined cross-section to minimize interference with gas flow. The hub 41 terminates in two arms 45 which are bored and provided with bushings for the cross 44 of a known type of universal joint (Hooke's joint). The cross 44 has a shaft journaled in the arms 43 and a shaft defining an axis at right angles thereto journaled in bearings 45 of a fixed supporting structure 47 for the throat ring. This support 47 is in the form of a tube flared to a flange 49 which is fixed to the bearing support ring 29 by a ring of bolts. Arms 50 which mount the bearings 45 extend from the downstream end of the support 47.

The outer surface of the hub 41 is of spherical contour. This spherical surface is continued by a ring 52 bolted to the hub 41. Ring 52 provides a close contact with the rear margin 53 of the tailcone 31. It is not necessary that this be a seal, but the spherical member 52 along with the hub 41 provides a smooth termination of the tailcone throughout the range of movement of the throat ring.

A piston ring seal 55 at the end of the exhaust duct 15 cooperates with the spherical outer surface of the throat ring. A stiffening flange 57 around the outlet of the throat ring has welded to it two angle brackets 58, each of which is fixed by bolts 59 to the downstream end of a generally triangular control arm 22. It will be noted that these arms extend around almost 90° of the periphery of the nozzle so as to distribute the force exerted by the actuators 18 on the throat ring. The arms 22 are lightweight hollow steel fabrication and are provided with an eye 61 for a pin 62 connecting to the piston rods 21 of the actuators 18.

It will be seen that the throat ring 17 is supported through the rigid struts 39, the universal joint, the rigid column 47, and the main turbine supporting struts 30 to the engine mounting ring 13. The exhaust duct 15 may be a lightweight and relatively flexible structure and need not carry any significant stresses. Thus, any tendency to binding due to distortion of the structures which would impede movement of the nozzle throat ring is prevented. In the structure shown, the throat ring can rotate 25° about any axis perpendicular to the axis of the engine through appropriate action of the two actuators 18. These may be controlled in any suitable way to swivel the jet about the two axes in quadrature and thereby accomplish any degree of deviation of the jet in any direction up to the structural limit of movement of the throat ring. The struts 39 are thin and streamlined and offer very little obstruction to flow of gas and the nozzle is efficient from the standpoint of recovery in velocity of the exhaust of the pressure in the exhaust duct.

The detailed description of the preferred embodiment of the invention for the purpose of explaining the principles thereof is not to be considered to limit or restrict the invention, since many modifications of the structure may be made within the scope of the invention.

I claim:
1. A jet engine comprising, in combination,
a gas generator including a turbine exhausting gas under pressure,
an exhaust duct conveying the gases, and a swiveling jet propulsion nozzle mounted at the outlet of the exhaust duct,
the engine including a turbine bearing support spider disposed downstream of the turbine,
a nozzle support fixed to the bearing support spider and extending downstream therefrom;
the nozzle comprising a throat ring having an outer surface conforming to a zone of a sphere,
a central hub,
and streamlined struts rigidly connecting the throat ring to the hub;
a swivel joint connecting the hub to the nozzle support, and
means coupled between the engine and the throat ring operable to swivel the throat ring about an axis transverse to the axis of the engine.

2. A jet engine comprising, in combination,
a gas generator including a turbine exhausting gas under pressure,
an exhaust duct conveying the gases, and
a swiveling jet propulsion nozzle mounted at the outlet of the exhaust duct,
the engine including a turbine bearing support spider disposed downstream of the turbine,
an inner tailcone extending downstream of the turbine defining an inner wall for the upstream portion of the exhaust duct,
a nozzle support fixed to the bearing support spider and extending downstream within the tailcone;
the nozzle comprising a throat ring having an outer surface conforming to a zone of a sphere,
a central hub,
and streamlined struts rigidly connecting the throat ring to the hub;
a swivel joint connecting the hub to the nozzle support,
a fairing disposed around the universal joint fixed to the jet propulsion nozzle and constituting the termination of the tailcone,
a seal disposed between the throat ring and the exhaust duct, and
means coupled between the engine and the throat ring operable to swivel the throat ring about an axis transverse to the axis of the engine.

3. A jet engine comprising, in combination,
a gas generator including a turbine exhausting gas under pressure,
an exhaust duct conveying the gases, and
a universally swiveling jet propulsion nozzle mounted at the outlet of the exhaust duct,
the engine including a turbine bearing support spider disposed downstream of the turbine,
an inner tailcone extending downstream of the turbine defining an inner wall for the upstream portion of the exhaust duct,
a nozzle support fixed to the bearing support spider and extending downstream within the tailcone;
the nozzle comprising a throat ring having an outer surface conforming to a zone of a sphere,
a central hub,
and streamlined struts rigidly connecting the throat ring to the hub;
a universal joint connecting the hub to the nozzle support,
a seal disposed between the throat ring and the exhaust duct, and
two actuators coupled between the engine and the throat ring operable to swivel the throat ring about two intersecting axes transverse to the axis of the engine.

4. A jet engine comprising, in combination,
a gas generator including a turbine exhausting gas under pressure,
an exhaust duct conveying the gases, and
a universally swiveling jet propulsion nozzle mounted at the outlet of the exhaust duct,
the engine including a turbine bearing support spider disposed downstream of the turbine,
an inner tailcone extending downstream of the turbine defining an inner wall for the upstream portion of the exhaust duct,
a nozzle support fixed to the bearing support spider and extending downstream within the tailcone;
the nozzle comprising a throat ring having an outer surface conforming to a zone of a sphere,
a central hub,
and streamlined struts rigidly connecting the throat ring to the hub;
a universal joint connecting the hub to the nozzle support,
a fairing of generally spherical exterior contour disposed around the universal joint fixed to the jet propulsion nozzle and constituting the termination of the tailcone,
a seal disposed between the throat ring and the exhaust duct, and
means coupled between the engine and the throat ring operable to swivel the throat ring about two intersecting axes transverse to the axis of the engine.

No references cited.

MARK NEWMAN, *Primary Examiner.*

C. R. CROYLE, *Assistant Examiner.*